(12) United States Patent
Walker

(10) Patent No.: US 7,077,453 B1
(45) Date of Patent: Jul. 18, 2006

(54) EXTENSIBLE COVER FOR VEHICLE TRUNKS

(76) Inventor: Brendon Walker, 406 Centennial Dr., Vienna, OH (US) 44473

(*) Notice: Subject to any disclaimer, the term of this patent is extended or adjusted under 35 U.S.C. 154(b) by 0 days.

(21) Appl. No.: 11/178,784

(22) Filed: Jul. 12, 2005

(51) Int. Cl.
*B62D 25/10* (2006.01)
(52) U.S. Cl. ............... 296/76; 295/26.06; 295/26.09
(58) Field of Classification Search ............... 296/163, 296/164, 26.08, 26.09, 136.01, 136.1, 136.11, 296/26.04, 26.05, 26.06; 135/88.01, 88.07, 135/88.13, 88.16, 88.15; 150/154, 166; 280/770
See application file for complete search history.

(56) References Cited

U.S. PATENT DOCUMENTS

| 4,519,409 | A | 5/1985 | Kinney et al. |
| 4,544,195 | A | 10/1985 | Gunn |
| 5,129,678 | A | 7/1992 | Gurbacki |
| 5,601,104 | A | 2/1997 | Perkins |
| 6,880,879 | B1 * | 4/2005 | Pickard ............... 296/136.01 |
| 2003/0230329 | A1 | 12/2003 | McGarty |

* cited by examiner

*Primary Examiner*—Lori L. Coletta
(74) *Attorney, Agent, or Firm*—Harpman & Harpman

(57) ABSTRACT

A collapsible protective cover for the trunk of a motor vehicle that extends from the trunk and therebeyond to protect an individual from environmental elements while accessing the trunk. Self-contained telescopically extensible self-supporting multiple panel configurations with individual flexible side flaps can be easily and quickly deployed from inside the open trunk lid to provide a temporary cover for the trunk and the user as they remove or replace items in the trunk for a short period of time.

8 Claims, 4 Drawing Sheets

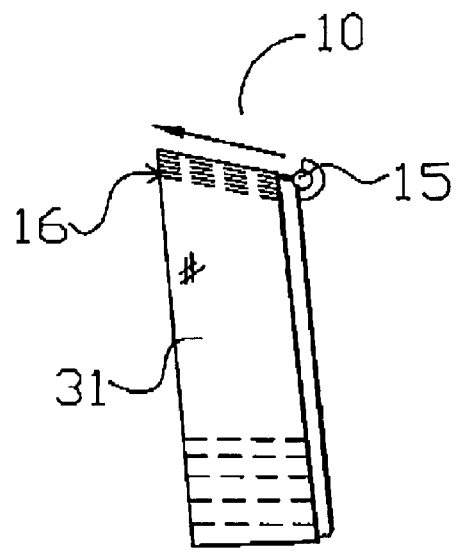
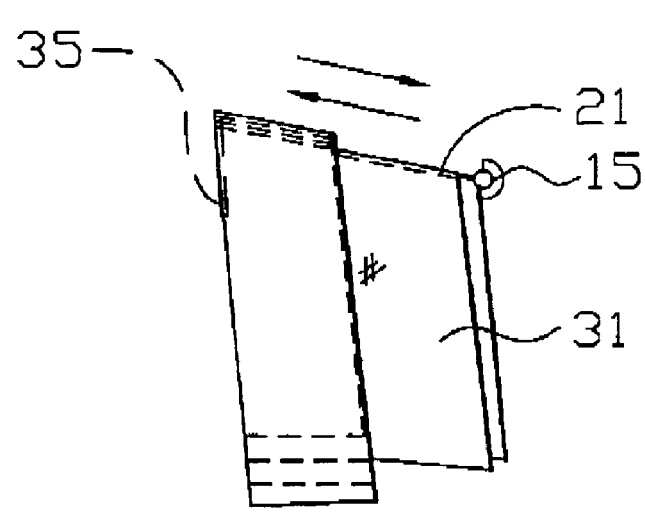
Fig. 3              Fig. 4
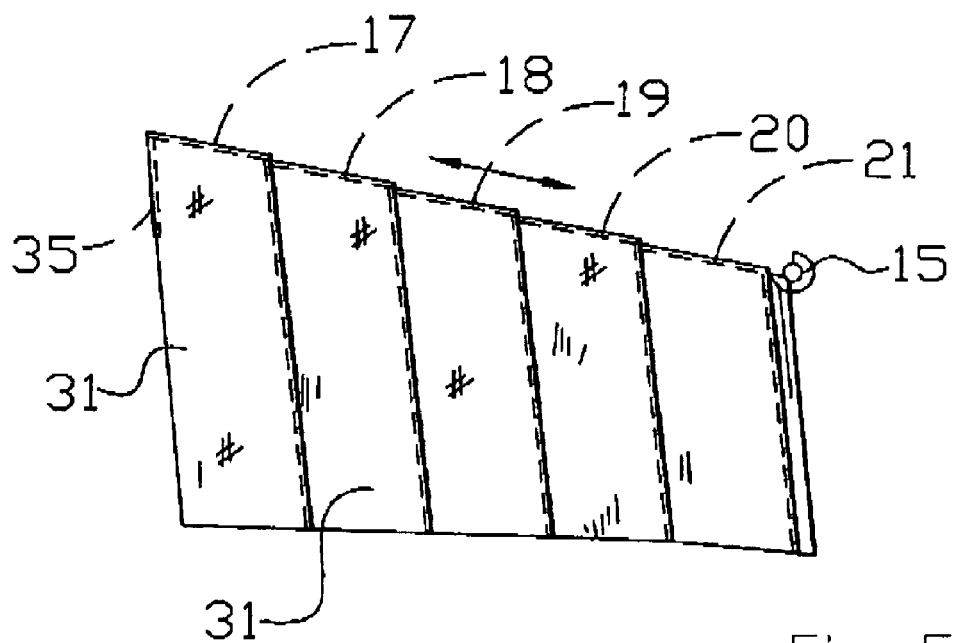
Fig. 5

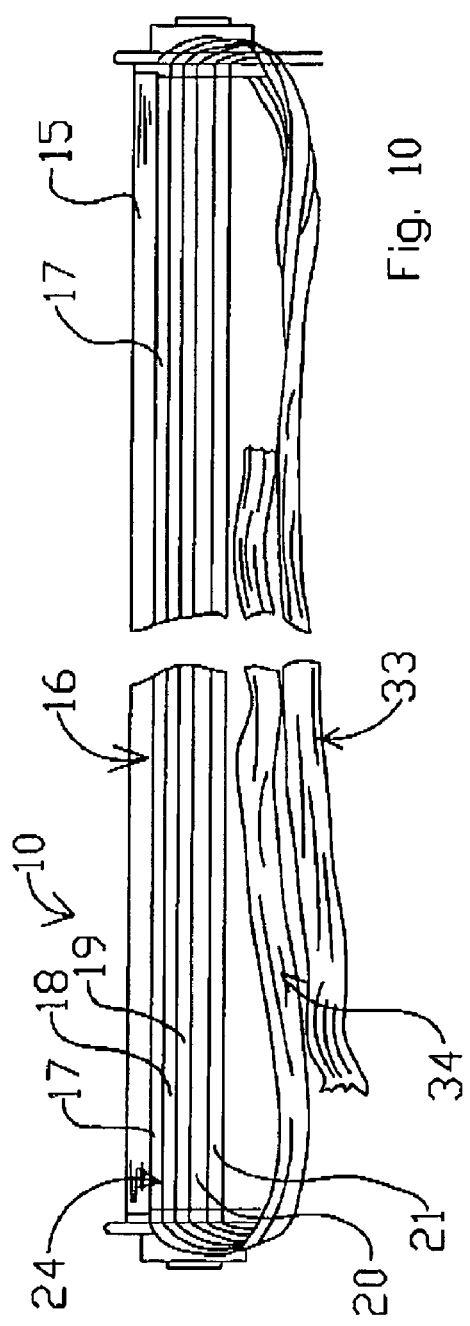
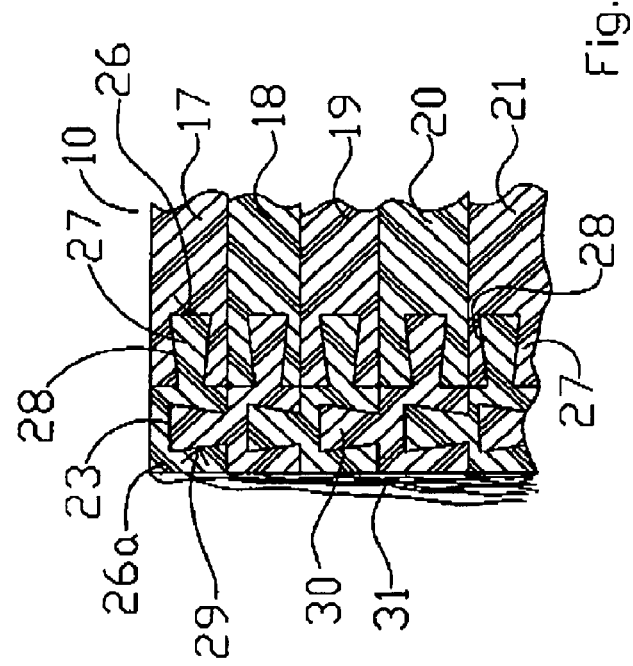
Fig. 10
Fig. 11

EXTENSIBLE COVER FOR VEHICLE TRUNKS

BACKGROUND OF THE INVENTION

1. Technical Field

This device relates to motor vehicles and deployable shades or covers that extend therefrom to form a temporary shelter over the trunk area of the vehicle to protect individuals from precipitation when accessing the truck.

2. Description of Prior Art

Prior art devices of this type have been directed towards awnings and shade covers that attach to a motor vehicle from the trunk area, see for example U.S. Pat. Nos. 4,519,409, 4,544,195, 5,601,104, 5,129,678 and Patent Publication 2003/023032 A1.

In U.S. Pat. No. 4,519,409 an awning for attachment to a rear bumper of an automobile is disclosed having a multiple part tubular support frame attached to a bumper with a fabric cover extending from the vehicle thereover.

U.S. Pat. No. 4,544,195 is directed to a rear cover for a pick-up truck on which a camper cap has been installed. The cover configuration uses a hinge rear access panel of the camper to support the flexible material having a pair of screen window inserts and a central zipper positioned therebetween.

U.S. Pat. No. 5,601,104 claims an auto tent in which a portable canopy formed of tubular sections that extends from a pair of support plates on which the wheels of the vehicle are parked. A weather resistant cover slips over the ends of the extended form defining a canopy thereover.

U.S. Pat. No. 5,129,678 illustrates a dirt and grease protective cover for the rear of an automobile that essentially hangs out of the trunk of the vehicle providing a cover over the lip of the trunk which typically an individual leans against when accessing the trunk.

Finally, in U.S. Patent Publication 2003/023032 A1 a shade cover device for attachment to the tailgate portion of a vehicle is shown having a pair of angularly disposed support struts extending from the bumper and held by return support cables from the open tailgate of an SUV.

SUMMARY OF THE INVENTION

A compact deployable cover that selectively extends from the interior of a vehicle's trunk lid to provide a weather resistant barrier over the trunk and the area adjacent thereto. The cover has rigid interlocking panels with attached flexible side curtain flaps extending therefrom. The cover is preferably attached to the underside of the vehicle's trunk lid and provides protection from the elements for individuals accessing the trunk.

DESCRIPTION OF THE DRAWINGS

FIG. 3 is a side elevational view of the cover panels fully retracted prior to deployment;

FIG. 4 is a side elevational view of the cover with the first panel being deployed with its associated flap;

FIG. 5 is a side elevational view of the cover with all of the panels deployed in use position independent of the vehicle;

FIG. 10 is a front elevational view of the cover assembly with portions broken away in stored position; and FIG. 11 is an enlarged partial cross-sectional view on lines 11—11 of FIG. 7.

DETAILED DESCRIPTION OF THE INVENTION

Figure 1:
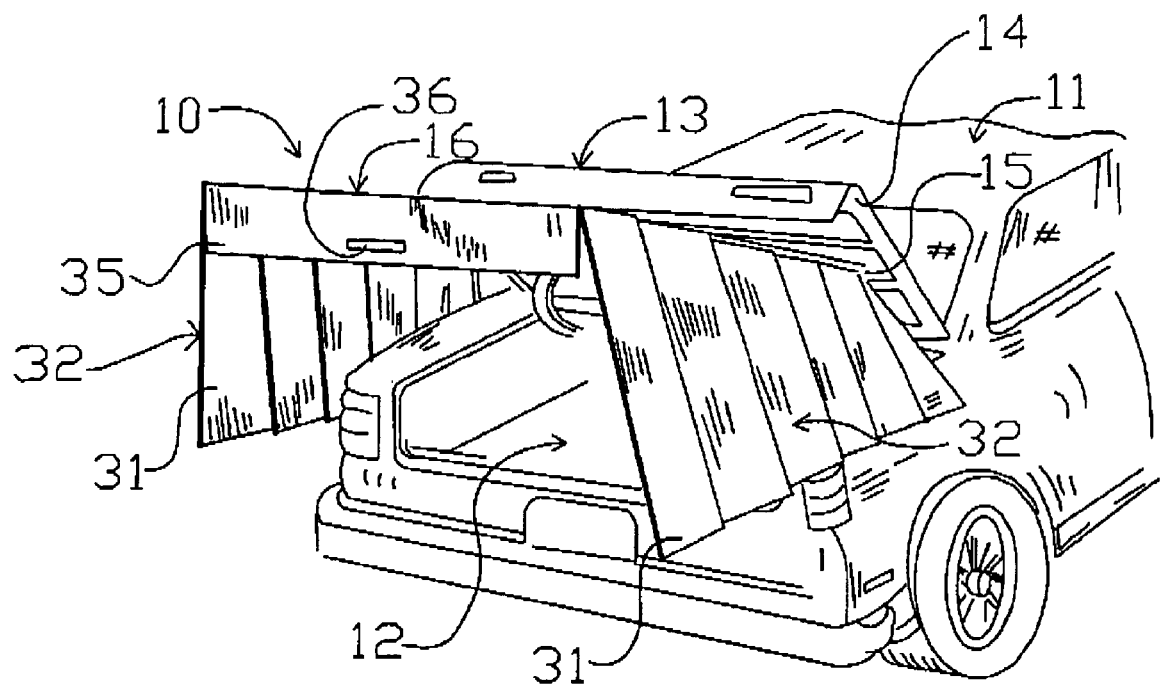
FIG. 1 is a perspective view showing the cover assembly of the invention attached to a vehicle in open deployed position.
Figure 2:
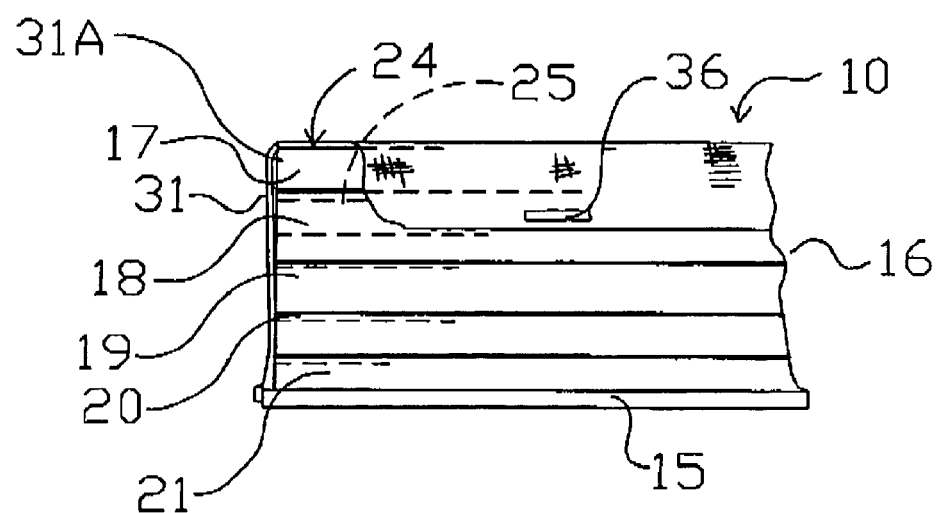
FIG. 2 is a partial end elevational view of the deployed cover independent of the vehicle.

Referring to FIG. 1 of the drawings, a collapsible cover 10 of the invention can be seen in use on a vehicle 11. The cover 10 is shown in deployed fully open position over a trunk 12 of the vehicle 11. The trunk lid 13 is open with the base of the cover 10 secured to its underside surface 14. The cover 10 of the invention has a mounting bracket assembly 15 from which a multiple panel assembly 16 is pivotally secured. The panel assembly 16 has a plurality of lightweight rigid rectangular panels 17–21 which are of equal dimension having oppositely disposed end edges 22 and 23 and interconnecting longitudinal front and back edges 24 and 25. The end edges 22 and 23 are grooved at 26 therealong with a key way configuration. Each of the panels 17–21 are fitted with inner engaging edge support track assembly pairs 26A, 26B, 26C, 26D and 26E, best seen in FIGS. 6–9 of the drawings that are registerably secured to their respective end edges 22 and 23 by corresponding keyed tongues 27 formed on and extending longitudinally from the respective edge support track assembly pairs.

An adhesive 28 is used within the key way grooves 26 to permanently bond the key tongues 27 of the edge support track assembly pairs in place so as to become integral with their respective panels.

Figures 6, 7:
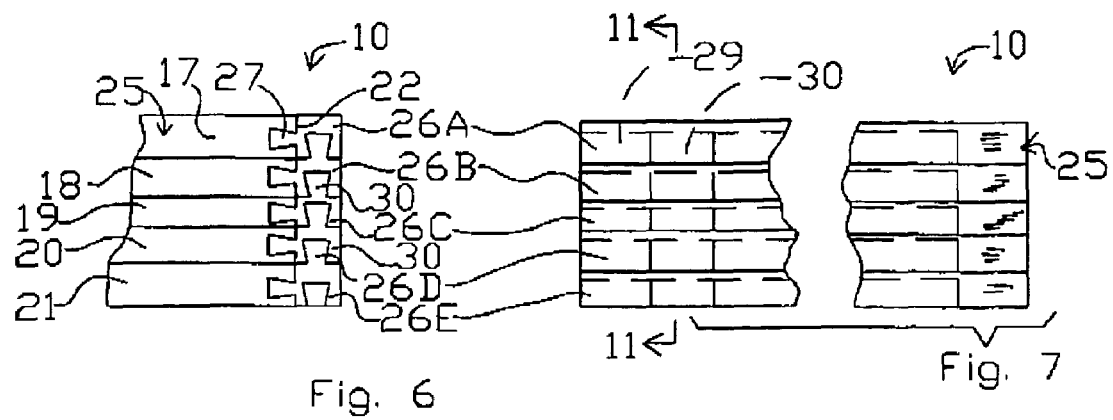
FIG. 6 is a partial enlarged front assembly view of multiple interengaged side slide engagement elements on panels in stored stacked position.
FIG. 7 is a partial enlarged side elevational view with portions broken away of multiple interengaging side slide elements on the panels in stored stacked position.
Figure 8:
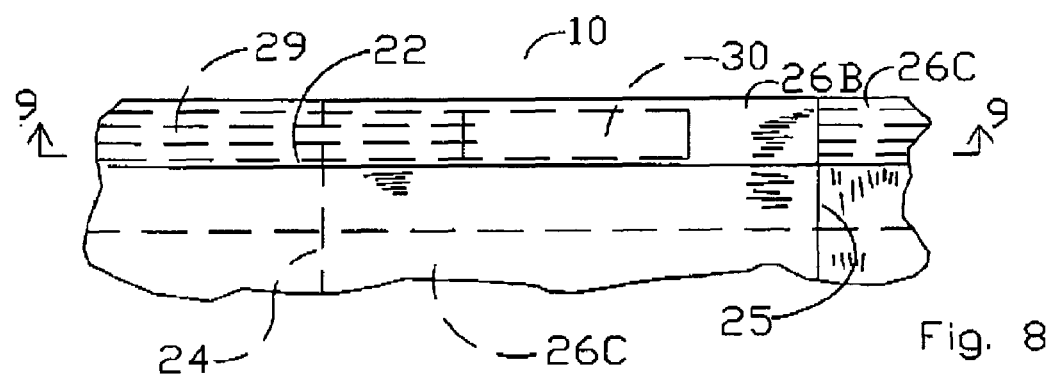
FIG. 8 is an enlarged partial top plan view of a portion of the slide element support assembly on the ends of the panels.

The edge support track assemblies 26A–26E have an elongated key way groove at 29 therein at right angular relation to the hereinbefore described tongue key 27. The key way groove at 29 extends from the respective panels front edge 24 to a point inwardly of its back edge at 25 as best seen in FIG. 7 of the drawings in dotted lines.

Figure 9:
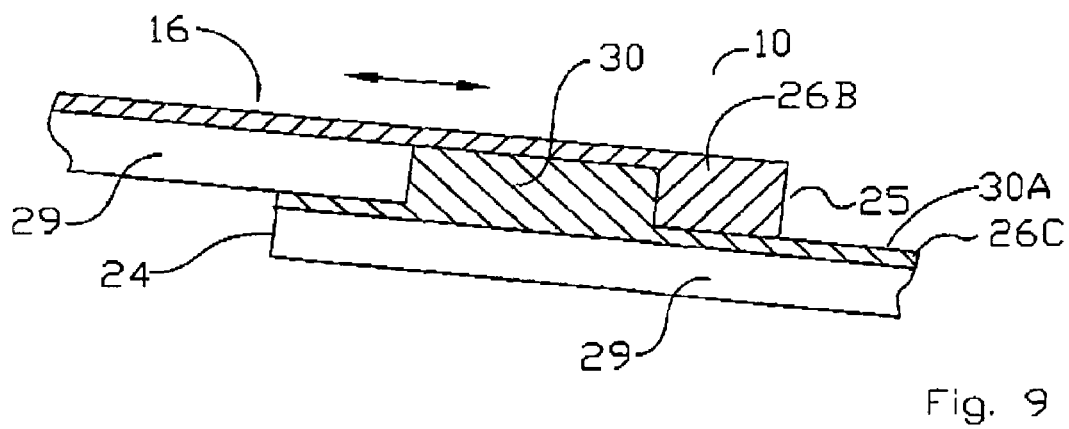
FIG. 9 is an enlarged partial section on lines 9—9 of FIG. 8.

A registration slide lug 30 is formed on and extends from the upper surface 30A of the respective edge support track assembly pairs 26A–26E in oppositely disposed relation to the hereinbefore disclosed key way groove at 29. The slide lug 30 is spaced inwardly from the end of the edge support track assembly pairs and is configured to be slidable disposed into the corresponding groove at 29 of an adjacent panel as best seen in FIGS. 9 and 11 of the drawings.

The panels 17–21 are accordingly arranged in an overlapping front edge 24 to back edge 25 orientation so as to be slidable disposed one on top of another in vertical stacked telescopically extensible relationship.

It will be evident from the above description that due to the effective overlap engagement of the front and back panel portions that the inner engaged slide lugs 30 will impart sufficient structural support so each of the panels 17–21 will be supported by the adjacent panel providing a self-supporting cantilevered telescopically extensible integral structure when deployed.

Each of the panels 17–21 have a flexible side flap 31 extending from their respective support tracks 26 outer edge surfaces 31A as best seen in FIG. 11 of the drawings. The side flaps 31 are of varying length and overlap adjacent flaps 31 so that they will provide an integral flexible sidewall at 32 as illustrated in FIGS. 1 and 3 of the drawings when fully deployed.

In use, the panels 17–21, as noted, are initially stacked together, see FIGS. 6 and 7, under the trunk lid 13 of the vehicle 11 within the support bracket 15 with the side flaps 31 being pulled together in concentric bundles 33 and 34 which overlie one another and are held in place by auxiliary clips (not shown) as illustrated generally in FIG. 10 of the drawings.

The top panel 17 has a flexible deployment flap 34 extending from along its front edge 24 with an access grip opening at 35 therein. The flap 34 is used to deploy the multiple panels 17–21 by manually gripping same by the handle opening 36 as well as providing a return drop down weather shield behind and above the user (not shown) standing in front of the trunk 12 during access.

As the flap 34 is pulled the panel 17 slides forward and the adjacent panel 18 slide lugs 30 within the key grooves 29 which then pull the next panel 19 forward when the lugs 30 engage the end of the grooves 29 in the same manner repeating until all of the panels 17–21 are fully deployed and locked in position as illustrated sequentially in FIGS. 3, 4 and 5 of the drawings.

It will be evident from the above description that as the panels 17–21 are extended that the corresponding side flaps 31 will extend also in overlapping action until fully opened as seen in FIG. 5 of the drawings.

After use, the cover 10 of the invention is retracted by pulling the panel 17 back towards the trunk lid 13 telescopically collapsing the panels one upon the other and stacking the multiple panels for storage as hereinbefore described.

The panels 17–21 are molded preferably from synthetic resin material, but could be made of any suitable material with required structural rigidity and weight characteristics to be compliant with the required cantilever support action embodied by their structure. The multiple side flaps 31 are preferably transparent to provide as much natural light as possible for the open trunk 12.

It will thus be seen that a new and novel vehicle trunk cover 10 has been illustrated and described and it will be apparent to those skilled in the art that various changes and modifications may be made therein without departing from the spirit of the invention.

I claim:

1. A cover for use on motor vehicles having a trunk and a trunk lid comprising,
    a plurality of interengaging rigid panels extending out over and beyond the trunk when open,
    each of said panels having a front edge portion and a back edge portion and oppositely disposed end edge portions,
    flexible side flaps extending from respective panels end edge portions,
    said panels slidably secured to one another by registering guide track and slides therewithin,
    means for selectively securing said cover to said vehicle,
    means for engageable deployment of said cover from a first stored position to a second extended operable position.

2. The cover for use on a motor vehicle set forth in claim 1 wherein said panel's back edge portion overlay said adjacent panel's front edge portion when fully extended.

3. The cover for use on a motor vehicle set forth in claim 1 wherein a pair of said flexible side flaps partially overlap one another when said cover is fully extended.

4. The cover for use on a motor vehicle set forth in claim 1 wherein said flexible side flaps are of unequal length from panel to panel.

5. The cover for use on a motor vehicle set forth in claim 1 wherein said guide tracks on said panels are secured to said panel's respective end edge portions.

6. The cover for use on a motor vehicle set forth in claim 1 wherein said slide tracks on said respective panels comprises,
    upstanding elongated key shaped lugs registerable within said guide tracks of said adjacent panel.

7. The cover for use on a motor vehicle set forth in claim 1 wherein said means for selectively securing said cover to the vehicle comprises,
    a bracket assembly secured to the underside of said trunk lid.

8. The cover for use on a motor vehicle set forth in claim 1 wherein said means for engageable deployment of said cover from a first position to a second extended operable position comprises,
    a deployment flap extending from one of said panels and means for manually engaging same therewithin.

* * * * *